United States Patent
Ling

(10) Patent No.: US 9,578,383 B2
(45) Date of Patent: *Feb. 21, 2017

(54) METHOD AND APPARATUS FOR COMMUNICATING ELECTRONIC SERVICE GUIDE INFORMATION IN A SATELLITE TELEVISION SYSTEM

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/262,917

(22) Filed: Apr. 28, 2014

(65) Prior Publication Data

US 2014/0289769 A1    Sep. 25, 2014

Related U.S. Application Data

(63) Continuation of application No. 13/301,394, filed on Nov. 21, 2011, now Pat. No. 8,713,609.

(51) Int. Cl.

| | |
|---|---|
| *H04N 5/445* | (2011.01) |
| *H04N 21/482* | (2011.01) |
| *H04N 21/43* | (2011.01) |
| *H04N 21/436* | (2011.01) |
| *H04N 21/4363* | (2011.01) |
| *H04N 21/462* | (2011.01) |
| *H04H 40/90* | (2008.01) |
| *H04H 60/72* | (2008.01) |
| *H04H 60/82* | (2008.01) |

(Continued)

(52) U.S. Cl.
CPC ............ *H04N 21/482* (2013.01); *H04H 40/90* (2013.01); *H04H 60/72* (2013.01); *H04H 60/82* (2013.01); *H04N 21/43* (2013.01); *H04N 21/436* (2013.01); *H04N 21/4382* (2013.01); *H04N 21/43637* (2013.01); *H04N 21/44209* (2013.01); *H04N 21/4622* (2013.01)

(58) Field of Classification Search
CPC ................... H04N 21/44209; H04N 21/6125
See application file for complete search history.

(56) References Cited

U.S. PATENT DOCUMENTS

| | | | |
|---|---|---|---|
| 7,373,650 B1 * | 5/2008 | Rodriguez et al. | ............. 725/41 |
| 8,108,895 B2 | 1/2012 | Anderson et al. | |
| 8,713,609 B2 * | 4/2014 | Ling | ................................ 725/54 |

(Continued)

*Primary Examiner* — Junior Mendoza
(74) *Attorney, Agent, or Firm* — McAndrews, Held & Malloy

(57) ABSTRACT

Aspects of a method and apparatus for communicating electronic service guide information in a satellite television system are provided. A satellite communication system may receive a signal via an interface to a satellite dish, and receive data from a network via a second interface (e.g., an interface to a LAN or a WAN, such as the Internet). The satellite communication system may be operable to channelize the received satellite signal into a plurality of channels, wherein a first channel of the plurality of channels carries electronic service guide (ESG) data. The satellite communication system may select which of the plurality of channels to input to a demodulator based, at least in part, on whether ESG data is available via the second interface. A second channel carrying media data may be input to the demodulator while the ESG data is available via the second interface.

16 Claims, 7 Drawing Sheets

(51) Int. Cl.
*H04N 21/442* (2011.01)
*H04N 21/438* (2011.01)

(56) References Cited

U.S. PATENT DOCUMENTS

| | | | |
|---|---|---|---|
| 2002/0152473 A1* | 10/2002 | Unger | 725/120 |
| 2005/0177849 A1* | 8/2005 | Pietraszak | H04N 5/44543 725/44 |
| 2005/0183116 A1 | 8/2005 | Pietraszak et al. | |
| 2006/0080718 A1 | 4/2006 | Gray et al. | |
| 2007/0186239 A1* | 8/2007 | Briggs | 725/39 |
| 2010/0027411 A1* | 2/2010 | Weber et al. | 370/216 |
| 2010/0306804 A1* | 12/2010 | Mountain | H04N 5/44543 725/54 |
| 2011/0314503 A1 | 12/2011 | Ruiz-Velasco et al. | |
| 2012/0131605 A1* | 5/2012 | Aoki | H04N 5/44543 725/27 |

* cited by examiner

METHOD AND APPARATUS FOR COMMUNICATING ELECTRONIC SERVICE GUIDE INFORMATION IN A SATELLITE TELEVISION SYSTEM

INCORPORATION BY REFERENCE

This application is a continuation of U.S. patent application Ser. No. 13/301,394 filed on Nov. 21, 2011, now U.S. Pat. No. 8,713,609.

The above-referenced application is hereby incorporated herein by reference in its entirety.

FIELD OF THE INVENTION

Certain embodiments of the invention relate to satellite communications systems. More specifically, certain embodiments of the invention relate to a method and system for communicating electronic service guide information in a satellite television system.

BACKGROUND OF THE INVENTION

Present broadband receivers, for example those utilized in satellite television systems, are inflexible and limited in capabilities. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communicating and/or processing electronic service guide information in a satellite television system, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" refer to functions than can be implemented in hardware, software, firmware, or any combination of one or more thereof. As utilized herein, the term "exemplary" means serving as a non-limiting example, instance, or illustration.

Figure 1A:
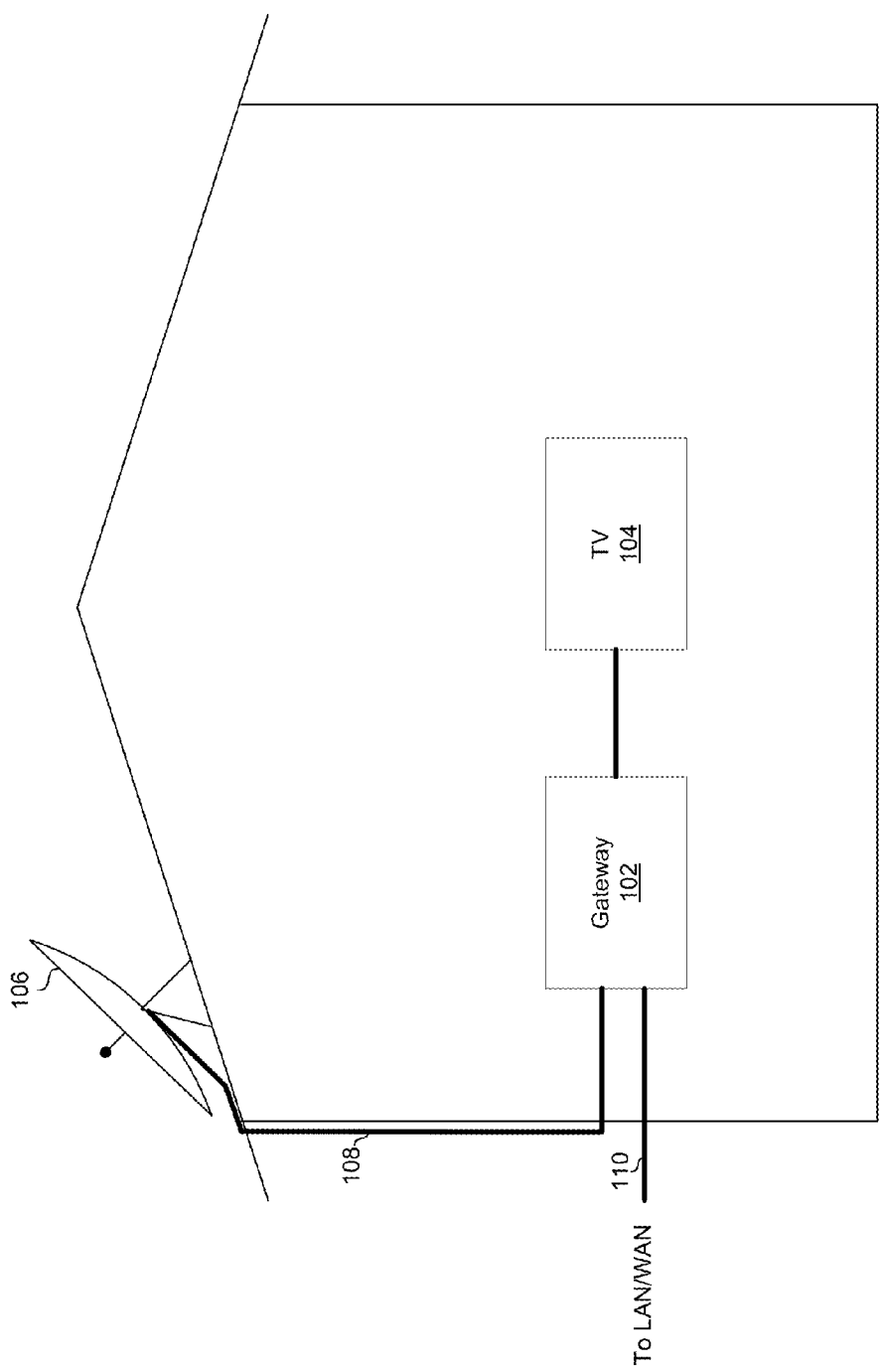
FIG. 1A depicts an exemplary satellite communication system.

FIG. 1A depicts an exemplary satellite communication system. Referring to FIG. 1A, there is shown a satellite communication system comprising a satellite dish 106, a gateway 102, and a television 104. The gateway 102 is coupled to the satellite dish 106 via a communication link 108 and coupled to a local area network (LAN) and/or wide area network (WAN) via a communication link 110. As a non-limiting example, the gateway 102 may be communicatively coupled to an ESG server (e.g., at or associated with a satellite broadcast company) via link 110 and the Internet.

Each of the communication links 108 and 110 may comprise one or more wired, wireless, and/or optical links. The communication link 110 may, for example, comprise one or more links which carry physical layer symbols in accordance with one or more of DSL, Ethernet, and/or multimedia over coaxial alliance (MoCA) standards. Also for example, the communication link 110 may operate in accordance with any of a variety of wireless communication protocols. The communication link 108 may comprise, for example a coaxial cable and/or a 60 GHz wireless link.

The satellite dish 106 may comprise circuitry operable to receive satellite signals and output the received signals to the gateway 102 via the communication link 108. The satellite dish 106 may, for example, comprise an RF front-end for processing received signals in the analog domain, and conveying the analog signals to the gateway 102 via the link 108. A signal received by the satellite dish 106 may comprise a plurality of frequency division multiplexed channels. One or more of the channels may carry media (i.e., audio, video, graphics, etc.) data, and one or more of the channels may carry electronic service guide (ESG) data. The ESG data may provide information about the channels carried in the satellite signal. For example, the ESG data may indicate the channels carried in the signal 106, and may provide information on where and how the channels can be accessed (e.g., information for demodulating, decrypting, and/or decoding the channels).

The gateway 102 may comprise circuitry operable to receive satellite signals, process the received signals to recover data, and output the data to an end-user device such as the television 104. The gateway 102 may also comprise circuitry operable to transmit and/or receive data over the communication link 110.

The television 104 may comprise circuitry operable to receive media data and control data from the gateway 102, process the received data to recover audio and/or video, and present the audio and/or video to a viewer.

In operation, the satellite dish 106 may receive a satellite signal, amplify and/or otherwise process the signal in the analog domain, and convey the analog signal to the gateway 102 via the communication link 108. The gateway 102 may process the analog signal received via the link 108 to recover media and/or other data communicated in the satellite signal. The gateway 102 may obtain ESG data associated with the satellite signal by demodulating a channel of the satellite signal that carries ESG data, and/or may receive ESG data via the communication link 110.

The gateway 102 may utilize the ESG data to access channels carried in the satellite signal. For example, a user of the gateway 102 may request television network XYZ. The gateway 102 may utilize the ESG to find the frequency of television channel XYZ in the signal 203. The gateway 102 may then tune to the found frequency, and demodulate (and otherwise process, as necessary or desired) the channel at that frequency to recover the media being broadcast on television channel XYZ. The gateway 102 may output the media to the television 104 where it may be further processed (as desired or necessary), and presented.

Figure 1B:
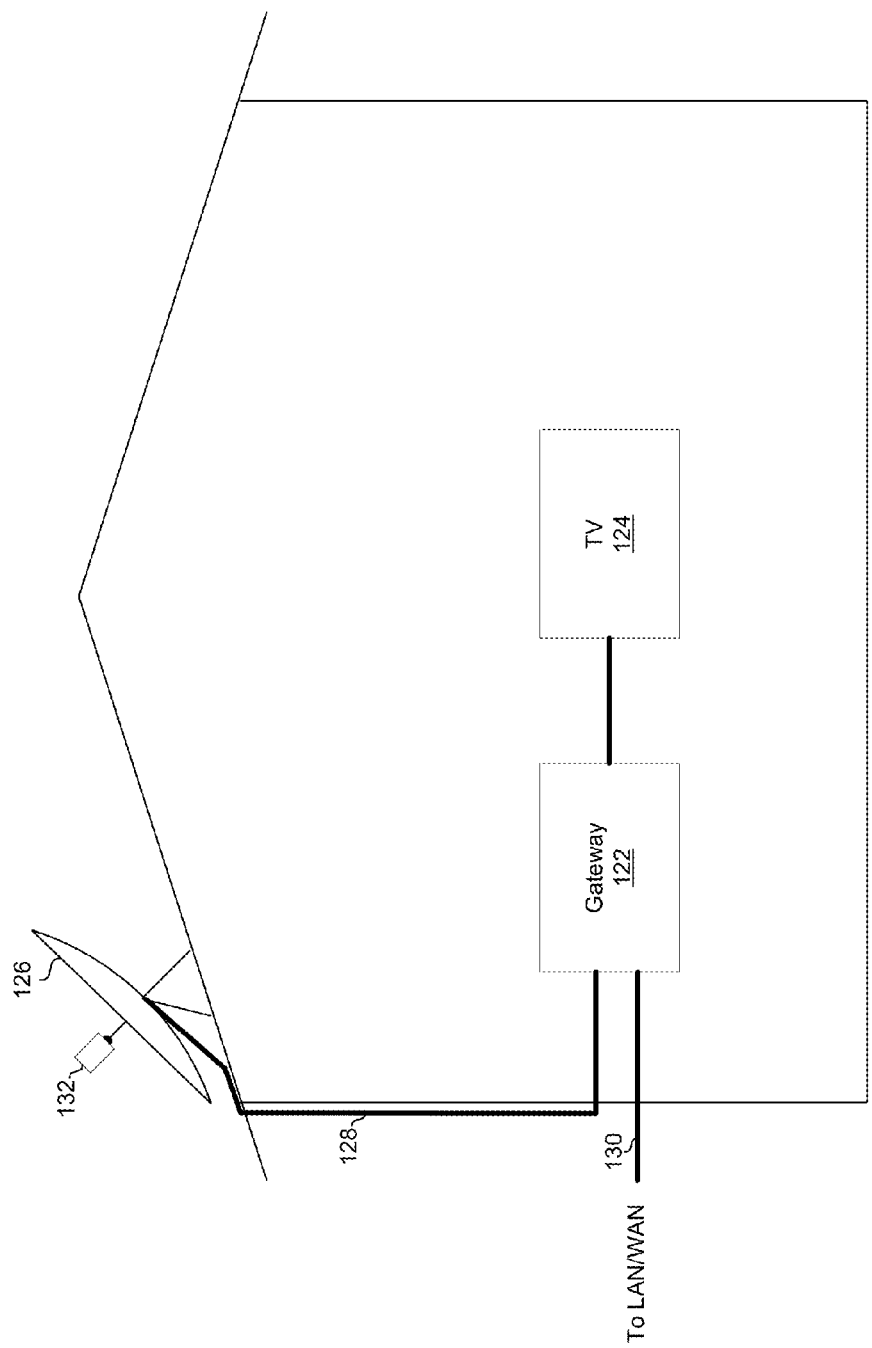
FIG. 1B depicts an exemplary satellite communication system.

FIG. 1B depicts an exemplary satellite communication system. Referring to FIG. 1B, there is shown a satellite dish 126, a communication link 128, a communication link 130, a gateway 122, and a television 124.

The television 124 may be substantially similar to the television 104 described with respect to FIG. 1A. The communication link 130 may be substantially similar to the communication link 110 described with respect to FIG. 1A.

The satellite dish 126 may be similar to the satellite dish 106, but may differ in that it comprises a processing module 132 that is operable to convert a received signal to a digital representation before communicating it to the gateway 122 via the link 128 (e.g., in the form of Internet Protocol (IP) packets). In some instances, the module 132 may be operable to perform additional digital-domain processing of the received signal prior to conveying the signal to the gateway 122.

The gateway 122 may be substantially similar to the gateway 102 described in FIG. 1A but may receive digital signals over the link 128, whereas the gateway 102 in FIG. 1A receives analog signals via the link 108.

Figure 2:
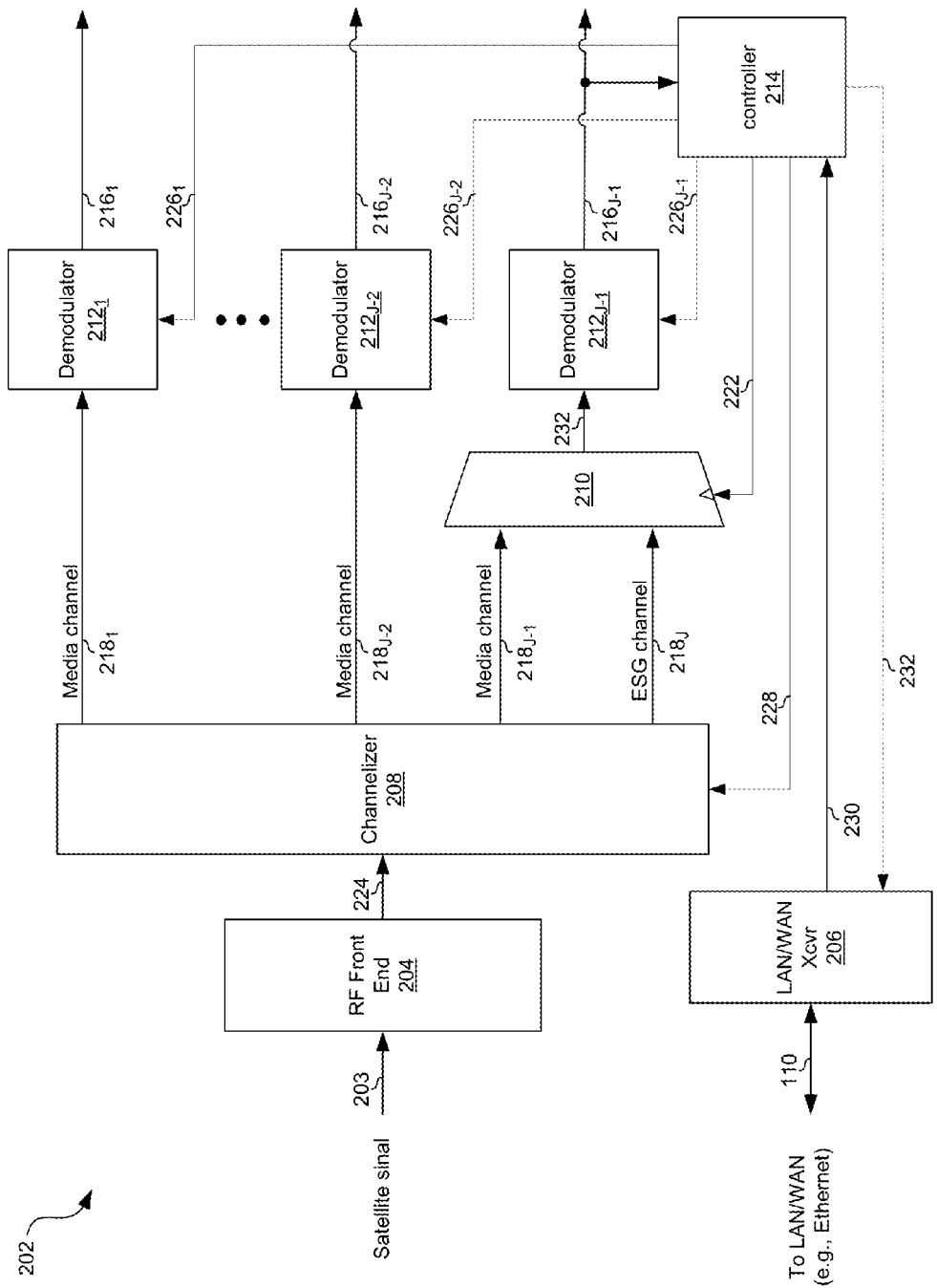
FIG. 2 depicts a portion of a satellite communication system such as the systems in FIGS. 1A and 1B.

FIG. 2 depicts a portion of a satellite communication system such as the systems in FIGS. 1A and 1B. Referring to FIG. 2 there is shown a system 202 comprising RF front-end module 204, a LAN/WAN transceiver module 206, a channelizer module 208, a switching module 210 (e.g., a multiplexer), and a plurality of demodulator modules $212_1$-$212_{J-1}$, where J is an integer greater than 1, and a control module 214. The system 202 may, for example, reside in the gateway 102, in the module 132, or may be distributed between the gateway 122 and the module 132.

The signal 203 may, for example, be the result of a plurality, K, of channels being frequency division multiplexed into a single signal. The signal 203 may occupy a frequency band from $F_{lo}$ lo $F_{hi}$. The RF front-end 204 may be operable to process a received RF signal 203 to generate a digital signal 224. The RF front-end 204 may, for example, amplify, down-convert, filter, and/or digitize the received signal 203 to generate the digital signal 224.

The channelizer 208 may, for example, be operable to select J channels contained in the signal 224 and output the selected channels as signals $218_1$-$218_J$. Each of the signals $218_1$-$218_{J-1}$ may, for example, carry media (e.g., each corresponding to a particular television channel). The signal $218_J$ may, for example, carry ESG data. The channelizer 208 may be controlled based on the signal 228.

The switching module 210 may be operable to couple, at any particular time, either the signal $218_{J-1}$ or the signal $218_J$ to the demodulator $212_{J-1}$. Which of the signals is coupled to the demodulator $212_{J-1}$ may depend on the signal 222. By repeatedly switching the signal 222, the signals $218_{J-1}$ and $218_J$ may be coupled to the demodulator $212_{J-1}$ in a time-division multiplexed manner.

Each of the plurality of demodulator modules $212_1$-$212_{J-1}$ may be operable to demodulate the signal input to it. The demodulators $212_1$-$212_{J-1}$ may be configured based on the signals $226_1$-$226_{J-1}$.

The control module 214 may be operable to generate signals $226_1$-$226_{J-1}$, 222, and 228. A state of one or more of the signals $226_1$-$226_{J-1}$, 222, and 228 may be controlled based on received ESG data.

In an exemplary operation, on power-up, the system 202 may need to obtain ESG data associated with the signal(s) 203 so that it can find and process one or more of the channels of the signal 203. The processing may comprise, for example, demodulating, decoding, and decrypting media carried on the one or more channels for presentation via an end-user device (e.g., television 104 or 124). The controller 214 may determine whether ESG data is available via the link 110 and control the state of signal 222 accordingly. Such a determination may be made by, for example, detecting whether the link 110 is active (e.g., via a ping), searching for an ESG server, sending a request for ESG data to a known ESG server, pinging a known ESG server to determine if a connection to the ESG server is active, etc.

In instances that ESG data is available via the link 110, the controller 214 may receive the ESG data via the link 110 and bus 230. In instances that ESG data is not available via the link 110, the controller 214 may configure the module 210 to route the signal $218_J$ to the demodulator $212_{J-1}$, and may configure the demodulator $212_{J-1}$ to demodulate the signal $218_1$. Such configuration of the demodulator $226_{J-1}$ may comprise, among other things, tuning the demodulator $212_{J-1}$ to the center frequency of the ESG channel (which may, for example, be predetermined). When the module 210 is configured to route the signal $218_J$ to the demodulator $216_{J-1}$, the controller may receive the ESG data via line $216_{J-1}$.

The ESG data may, for example, indicate a center frequency and/or frequency range of each the channels in the signal 203. Once the system is in possession of the ESG data, it may begin normal operation. For illustration, we will assume J=4 and one or more users of the system 202 concurrently desire channels X, Y, and Z. The invention, however, is not limited to any particular value of J.

The RF front-end 204 may amplify, filter, down-covert and digitize the received satellite signal 203 to generate the digital signal 224. The controller 214 may utilize the previously-received ESG data to configure the channelizer 208 such that channels X, Y, and Z in the signal 224 are output as signals $218_1$, $218_2$, and $218_3$, respectively. The controller 214 may utilize the previously-received ESG data to control the signal $226_1$ such that the demodulator $212_1$ is tuned to the frequency range corresponding to channel X. The controller 214 may utilize the previously-received ESG data to control the signal $226_2$ such that the demodulator $212_2$ is tuned to the frequency range corresponding to channel Y.

As for the demodulator $212_3$, in instances that ESG data is continually needed, and is being received via the satellite signal 203, the demodulator $212_3$ may be allocated to demodulating the signal $218_4$. Consequently, the demodulator $212_3$ may be unavailable for demodulating the signal $218_3$ and the system 202 may be unavailable to output the media of channel Z concurrently with the media of channels X and Y. That is, the system 202 may be unable to concurrently output media corresponding to three television channels while also receiving ESG data via the satellite.

In instances that ESG data is being received via the link 110, the demodulator $212_3$ may be utilized for demodulating signal $218_3$. In this manner, the system 202 may concurrently output media corresponding to three television channels while concurrently receiving the ESG data via the link 110.

In instances that ESG data is received via the demodulator $212_N$, but is needed only periodically or occasionally, the controller 214 may time division multiplex the demodulator $212_3$ between processing the signal $218_3$ (channel Z) and the signal $218_4$ (the ESG channel). For example, the signal $218_4$ may be routed to the demodulator $212_3$ during blanking time of a video signal carried in the signal $218_3$ and/or only for a period of time sufficient to refresh ESG data when previously-received ESG data has become outdated.

In some instances, it may be desired to receive the ESG data from the satellite even if ESG is available via the link 110. Accordingly, the state of the signal 222 may be controlled based, in part, on a user setting (e.g., via a user-configurable hard or soft switch) that forces the system 202 to get ESG data from the channel $218_J$ regardless of whether ESG data is available via the link 110.

In some instances (indicated by dashed line 232), the controller 214 may be operable to output ESG data onto the link 110. The ESG data output by the controller via the link 110 may be communicated to another system (e.g., a gateway) via, for example, a MoCA network. For example, in a system comprising a plurality of gateways, one of the gateways may be designated for recovering the ESG data and distributing it to the rest of the gateways, such that the rest of the gateways can either power-down their respective demodulators $212_{J-1}$ or allocate their respective demodulators $212_{J-1}$ to handling media channels.

In an exemplary embodiment, special messages for managing power consumption may be received via the link 110 and utilized to manage power consumption, as is described in the above-incorporated U.S. Provisional Patent Application No. 61/555,550. In an exemplary embodiment, both power-management information and ESG data may be carried in such special messages. In an exemplary embodiment, the special messages may, for example, instruct the system 202 when to place one or more components of the system 202 into a lower-power mode. For example, a special message may instruct the system 202 to power down one or more of the demodulators $212_1$-$212_{J+1}$. In an exemplary embodiment, the special messages may instruct the system 202 how and when to configure the switching module 210.

Figure 3:
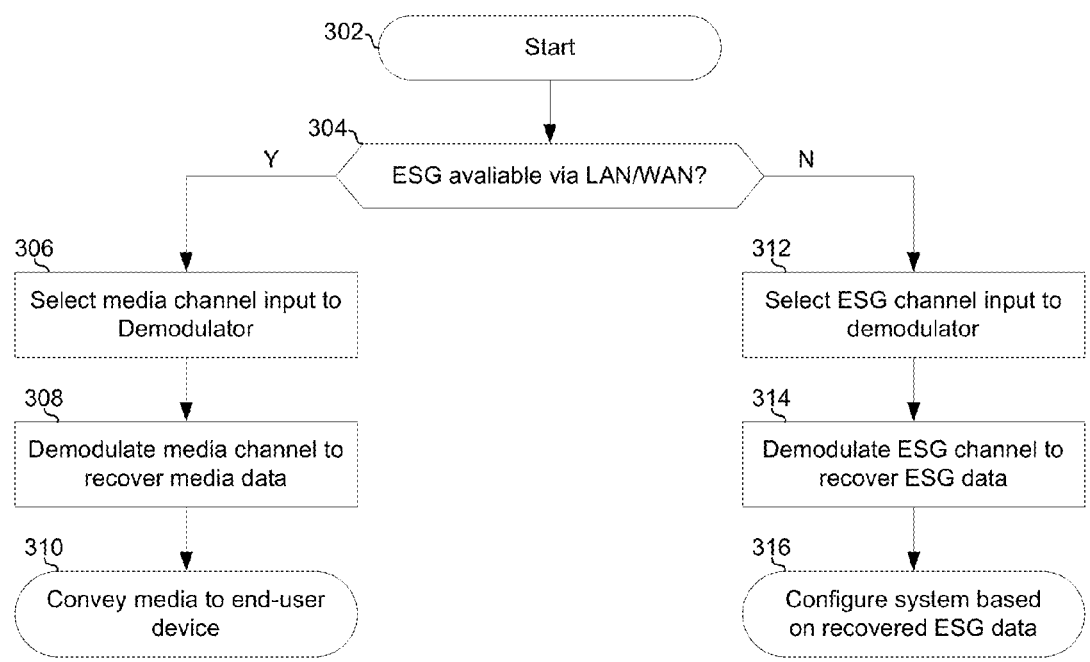
FIG. 3 is a flowchart illustrating exemplary steps for receiving electronic service guide (ESG) data in a satellite communication system.

FIG. 3 is a flowchart illustrating exemplary steps for receiving electronic service guide (ESG) data in a satellite communication system. Referring to FIG. 3, after start step 302, the exemplary steps may advance to step 304. In step 304, the system 202 may determine whether ESG data is available via the LAN/WAN link 110. If ESG data is available via the LAN/WAN link 110, the exemplary steps may advance to step 306. In step 306, the switching module 210 may be configured to couple the channel $218_{J-1}$ to the demodulator $212_{J-1}$. In step 308, the demodulator $212_{J-1}$ may demodulate the signal $218_{J-1}$ to recover media carried in the signal $218_{J-1}$. In step 310, the recovered media may be conveyed to an end-user device such as a monitor and/or speakers.

Returning to step 304, if ESG data is not available via the LAN/WAN link 110, the exemplary steps may advance to step 312. In step 312, the switching module 210 may be configured to couple the channel $218_J$ to the demodulator $212_{J-1}$. In step 314, the demodulator $212_{J-1}$ may demodulate the signal $218_J$ to recover ESG data carried in the signal $218_J$. In step 316, the recovered ESG data may be utilized to, for example, configure various modules of the system 202, and update parameters stored in the system 202.

Figure 4A:
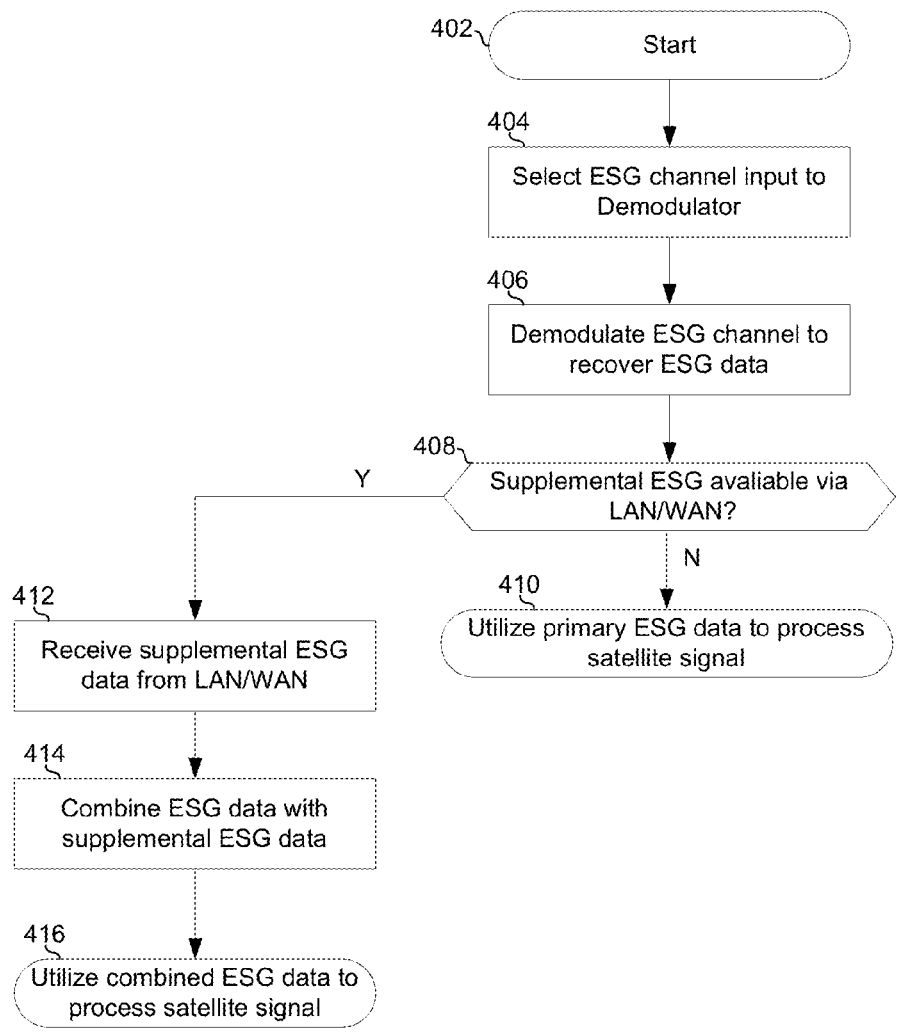
FIG. 4A is a flowchart illustrating exemplary steps for processing a satellite signal utilizing electronic service guide (ESG) data in a satellite communication system.

FIG. 4A is a flowchart illustrating exemplary steps for processing a satellite signal utilizing electronic service guide (ESG) data in a satellite communication system. The exemplary steps may be performed by, for example, the system 202 of FIG. 2. After start step 402, in step 404, a demodulator may be allocated for demodulating an ESG channel of a received satellite signal. In step 406, the demodulator may demodulate the ESG channel to recover ESG data. In this exemplary embodiment of the invention, the ESG data recovered from the satellite signal may be referred to as "primary" ESG data because, for example, it contains more complete ESG, more up-to-date, more reliable, and/or otherwise different than ESG data (if any) available via a WAN/LAN (e.g., a MoCA network). In step 408, it may be determined whether ESG data is available via a WAN/LAN connection (e.g., link 110). In this exemplary embodiment of the invention, ESG data recovered from the LAN/WAN connection may be referred to as "supplemental" ESG data because it is different in some way than ESG data (if any) carried in the satellite signal.

In instances that supplemental ESG data is not available via the LAN/WAN connection, the exemplary steps may advance to step 410. In step 410, the primary ESG data recovered from the satellite signal may be utilized for processing the satellite signal.

Returning to step 408, in instances that supplemental ESG data is available via the LAN/WAN connection, the exemplary steps may advance to step 412. In step 412, supplemental ESG data may be received from the LAN/WAN. In step 414, the supplemental ESG data may be combined with the primary ESG data. This may comprise, for example, replacing some of the primary ESG data with some corresponding supplemental ESG data, appending the supplemental ESG data to the primary ESG data, and/or modifying some or all of the primary ESG data based on the supplemental ESG data. In step 416, the combined ESG data may be utilized for processing the satellite signal.

Figure 4B:
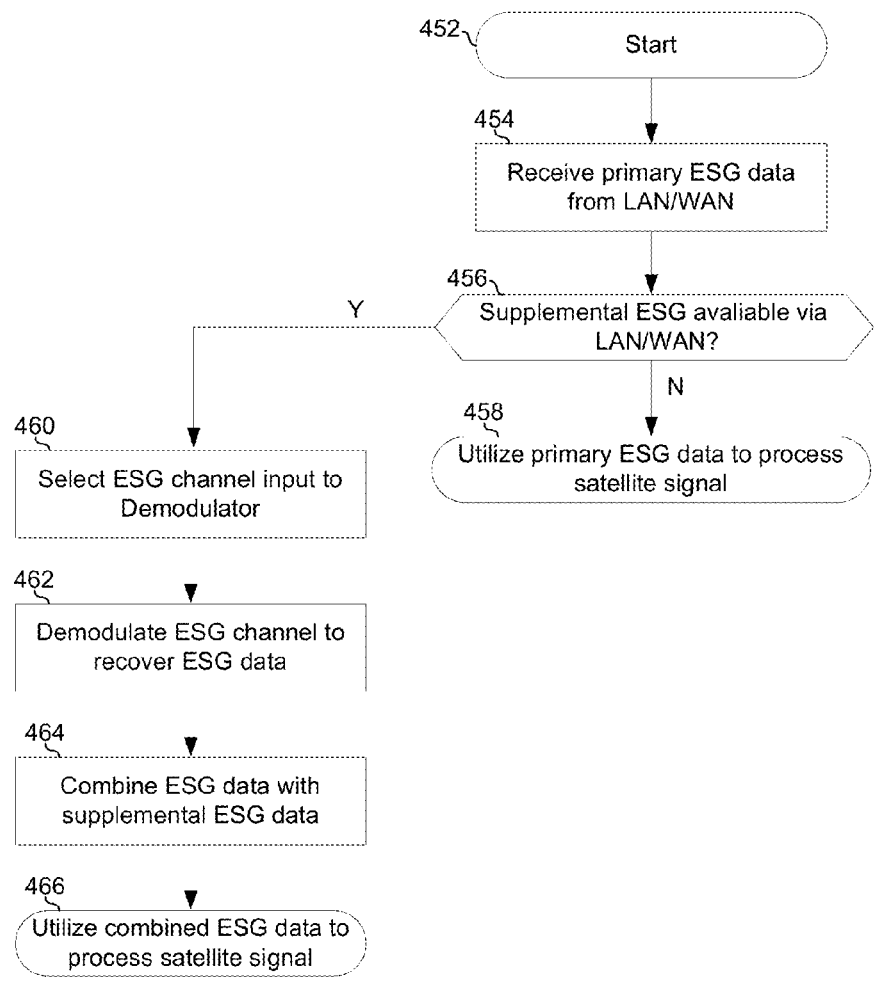
FIG. 4B is a flowchart illustrating exemplary steps for processing a satellite signal utilizing electronic service guide (ESG) data in a satellite communication system.

FIG. 4B is a flowchart illustrating exemplary steps for processing a satellite signal utilizing electronic service guide (ESG) data in a satellite communication system. The exemplary steps may be performed by, for example, the system 202 of FIG. 2. After start step 452, in step 454, ESG data may be received from a LAN/WAN (e.g., a MoCA network, a premises-based wireless LAN, a telecommunication network, a cable television network, etc.). In this exemplary embodiment of the invention, the ESG data received via the LAN/WAN may be referred to as "primary" ESG data because, for example, it contains more complete, more up-to-date, more reliable, and/or otherwise different than ESG data (if any) carried in the received satellite signal. In step 456, it may be determined whether ESG data is available via the satellite. In this exemplary embodiment, the ESG data in the satellite signal may be referred to as "supplemental" ESG data because it is different in some way than ESG data (if any) received via the LAN/WAN.

In instances that supplemental ESG data is not available via the LAN/WAN, the exemplary steps may advance to step 458. In step 458, the primary ESG data received from the LAN/WAN may be utilized for processing the satellite signal.

Returning to step 456, in instances that supplemental ESG data is available in the received satellite signal, the exemplary steps may advance to step 460. In step 460, a demodulator may be allocated for demodulating an ESG channel of the received satellite signal. In step 462, the demodulator may demodulate the ESG channel to recover supplemental ESG data. In step 464, the supplemental ESG data may be combined with the primary ESG data. This may comprise, for example, replacing some of the primary ESG data with some corresponding supplemental ESG data, appending the supplemental ESG data to the primary ESG data, and/or modifying some or all of the primary ESG data based on the supplemental ESG data. In step 466, the combined ESG data may be utilized for processing the satellite signal.

Figure 5:
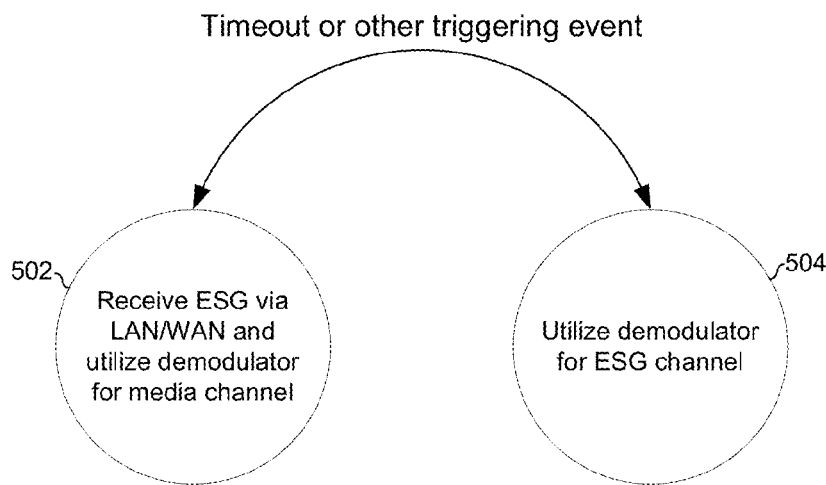
FIG. 5 is a state diagram illustrating exemplary states of a system operable to receive ESG data from a LAN/WAN.

FIG. 5 is a state diagram illustrating exemplary states of a system operable to receive ESG data from a LAN/WAN. The states 502 and 504 may be states of operation of a system such as the 202 of FIG. 2. In state 502, the system may receive ESG data from a LAN/WAN and may utilize a particular demodulator for processing a media channel of a received satellite signal. In state 504, the system may utilize the particular demodulator for processing an ESG channel of the received satellite signal. The system may transition between states occasionally and/or periodically.

In an embodiment of the invention, the system may start-up in state 504 to obtain initial ESG data, transition to state 502 after acquiring the initial ESG data, and thereafter receive ESG updates via the LAN/WAN. In an embodiment of the invention, the system may generally operate in state 504 but periodically (e.g., hourly, daily, weekly, etc.) transition to state 502 for a short period of time. In an embodiment of the invention, the system may operate in either state 502 or 504 based on a user setting and may transition between states only upon the user setting being changed. In an embodiment of the invention, a system operating in state 502 may transition to state 504 upon the connection to the LAN/WAN failing or becoming unreliable.

In an exemplary embodiment of the invention, a satellite communication system (e.g., system 202) may be operable to (i.e. capable of operating to) receive a signal via a first interface (e.g., an interface to a satellite dish) and receive data from a network via a second interface (e.g., an interface to a LAN or a WAN, such as the Internet). The satellite communication system may be operable to channelize the received satellite signal into a plurality of channels, wherein a first channel (e.g., the channel contained in signal $218_j$) of the plurality of channels carries electronic service guide (ESG) data. The satellite communication system may select which of the plurality of channels to input to a demodulator based, at least in part, on whether ESG data is available via the second interface. A second channel of the plurality of channels (e.g., the channel contained in signal $218_{J-1}$) may carry media data. An input to the demodulator may be time division multiplexed between the first channel and the second channel. The second channel may be input to the demodulator while the ESG data is available via the second interface, such that the demodulator is utilized for processing a media channel while the ESG data is available via the second interface. The demodulator may be configured based on received ESG data.

In an exemplary embodiment of the invention, the satellite communication system may be operable to receive supplemental ESG data via the second interface. The satellite communication system may be operable to demodulate, via the demodulator, the first channel to recover the ESG data carried on the first channel. The satellite communication system may be operable to process a portion (e.g., channels carried in signals $218_1$-$218_{J-2}$) of the plurality of channels utilizing the ESG data recovered from the first channel and the supplemental ESG data received via the second interface.

In an exemplary embodiment of the invention, the satellite communication system may be operable to control supply power provided to the demodulator based, at least in part, on whether ESG data is available via said second interface. Controlling the supply power may comprise, for example, controlling whether the demodulator is connected to or disconnected from a supply power, controlling a supply voltage level applied to the demodulator, and/or controlling a supply current available to the demodulator.

In an exemplary embodiment of the invention, the satellite communication system may be operable to demodulate, via the demodulator, the first channel to recover ESG data, and transmit the recovered ESG data via the second interface. The transmitting of the recovered ESG data may be via an in-home wireline or wireless network (e.g., an Ethernet or MoCA network).

Other embodiments of the invention may provide a non-transitory machine-readable (e.g., computer-readable) medium and/or storage medium, having stored thereon, a machine code and/or a computer program having at least one code section executable by a machine and/or a computer, thereby causing the machine and/or computer to perform the steps as described herein for communicating and/or processing electronic service guide information in a satellite television system.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for communicating and/or processing electronic service guide information in a satellite television system.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
a network gateway device comprising:
satellite interface circuitry configured to interface with a satellite dish for receiving a signal;
network interface circuitry configured to interface with a network device other than said satellite dish;
a demodulator; and
a controller operable to:
determine whether electronic service guide (ESG) data is present in a signal received from said network device other than said satellite dish; and
select which subset of a plurality of channels of said signal received from said network device other than said satellite dish are to be demodulated by said demodulator based on said determination of whether ESG data is present in said signal received from said network device other than said satellite dish, wherein:
said selection is of a media channel of said signal when said ESG data is present in said signal;
said selection is of an ESG channel of said signal when said ESG data is not present in said signal;
said demodulator is one of J demodulators;
said J demodulators are configured to demodulate J media channels of said signal when said ESG data is present in said signal;
said J demodulators are configured to demodulate J−1 media channels of said signal and one ESG channel of said signal when said ESG data is not present in said signal; and
J is a positive integer.

2. The system of claim 1, wherein said network device other than said satellite dish is part of an Ethernet network, digital subscriber line (DSL) network, Multimedia over Coax Alliance (MoCA) network, or cable television network.

3. The system of claim 1, wherein an output of said demodulator is transmitted into an in-home network.

4. The system of claim 3, wherein said in-home network is an Ethernet network or a Multimedia over Coax Alliance (MoCA) network.

5. The system of claim 1, wherein circuitry of said network gateway device is operable to receive primary ESG data via said satellite interface circuitry and supplemental ESG data via said network interface circuitry.

6. The system of claim 5, wherein said supplemental ESG data is more up-to-date than said primary ESG data.

7. The system of claim 5, wherein circuitry of said network gateway device is operable to modify said primary ESG data based on said supplemental ESG data.

8. The system of claim 1, wherein said controller is operable to power down said demodulator when ESG data is present in said signal received from said network device other than said satellite dish.

9. A method comprising:
performing by circuitry of a network gateway device that interfaces with a satellite dish:
determining whether electronic service guide (ESG) data is present in a signal received from a network device other than said satellite dish; and
selecting which subset of a plurality of channels of said signal received from said network device other than said satellite dish are to be demodulated by said circuitry of said network device based on a result of said determining whether ESG data is present in said signal received from said network device other than said satellite dish, wherein:
said selecting comprises:
selecting a media channel of said signal when said ESG data is present in said signal;
selecting an ESG channel of said signal when said ESG data is not present in said signal;
demodulator is one of J demodulators, and the method comprises
configuring said J demodulators to demodulate J media channels of said signal when said ESG data is present in said signal;
configuring said J demodulators to demodulate J−1 media channels of said signal and one ESG channel of said signal when said ESG data is not present in said signal; and
J is a positive integer.

10. The method of claim 9, wherein said network device other than said satellite dish is part of an Ethernet network, digital subscriber line (DSL) network, Multimedia over Coax Alliance (MoCA) network, or cable television network.

11. The method of claim 9, wherein an output of said demodulator is transmitted into an in-home network.

12. The method of claim 11, wherein said in-home network is an Ethernet network or a Multimedia over Coax Alliance (MoCA) network.

13. The method of claim 9, comprising receiving primary ESG data from said satellite dish and supplemental ESG data from said network device other than said satellite dish.

14. The method of claim 13, wherein said supplemental ESG data is more up-to-date than said primary ESG data.

15. The system of claim 13, comprising modifying said primary ESG data based on said supplemental ESG data.

16. The method of claim 9, comprising powering down said demodulator when ESG data is present in said signal.

* * * * *